United States Patent [19]

Brainard

[11] Patent Number: 5,406,858
[45] Date of Patent: Apr. 18, 1995

[54] GYRO PLATFORM ASSEMBLY

[75] Inventor: Robert E. Brainard, Truckee, Calif.

[73] Assignee: The United States of America as represented by the Secretary of the Navy, Washington, D.C.

[21] Appl. No.: 139,655

[22] Filed: Oct. 22, 1993

[51] Int. Cl.$^6$ .............................................. G01C 19/04
[52] U.S. Cl. ........................................................ 74/5.34
[58] Field of Search .............................. 74/5.22, 5.34

[56] References Cited

U.S. PATENT DOCUMENTS

| | | | |
|---|---|---|---|
| 2,958,522 | 11/1960 | Slater | 74/5.34 X |
| 3,214,983 | 11/1965 | Dozier | 74/5.34 |
| 3,310,986 | 3/1967 | Baecher | 74/5.34 |
| 3,338,166 | 8/1967 | Litman et al. | 244/3.2 |
| 3,365,148 | 1/1968 | Preston et al. | 244/3.2 |
| 3,398,586 | 8/1968 | Griffin et al. | 74/5.34 |
| 3,455,172 | 7/1969 | Burns | 74/5.34 |
| 3,509,765 | 5/1970 | Stevenson et al. | 74/5.34 |
| 3,701,200 | 10/1972 | Hojo | 74/5.34 X |
| 3,931,747 | 1/1976 | Erspamer | 74/5.34 |
| 4,136,844 | 1/1979 | Maudal | 244/3.2 |
| 4,275,605 | 6/1981 | Maudal | 74/5.34 |

Primary Examiner—Rodney H. Bonck
Attorney, Agent, or Firm—John P. Tarlano; Darrell E. Hollis

[57] ABSTRACT

A gyro platform assembly for determining a drift rate of a sensing axis of a first gyro, the sensing axis being fixedly aligned to a carrousel axis. The first gyro is on a plane of a first platform. The first platform is connected to a vehicle along the carrousel axis. The first platform has the plane and an opening. A second platform is connected to the first platform within the opening. The second gyro is on a surface of the second platform. The second platform is carrouselable around a carrousel axis that is perpendicular to the carrousel axis of the first platform. The second gyro has a sensing axis that is adjustably aligned with the sensing axis of the first gyro. When the vehicle rotates, each sensing axis experiences the same rotation rate. Each sensing axis produces a signal that is the result of the rotation rate of the vehicle, and a sensing axis drift rate. The second platform is carrouseled 180 degrees and the sensing axis of its gyro produces another signal. The drift rate of the sensing axis of the first gyro is determined from the three produced signals.

10 Claims, 4 Drawing Sheets

GYRO PLATFORM ASSEMBLY

BACKGROUND OF THE INVENTION

The present invention relates to a gyro platform assembly that can detect angular drift of sensing axes that are along three orthogonal axes.

Carrouseling has been used in the past to detect angular drifts of sensing axes that are perpendicular to a carrousel axis. Carrouseling of a platform has not been effective in detecting angular drift of a sensing axis of the rate gyro, wherein the sensing axis is parallel to the carrousel axis of the platform.

The disclosed assembly can be used to determine drift rates in three different mutually orthogonal vehicle motion sensing axes. The assembly has a platform that carrousels around a carrousel axis. A gyro on the first platform has a vehicle roll sensing axis that is parallel to the carrousel axis of the first platform and perpendicular to the carrousel axis of the second platform. The gyro on the first platform also has a vehicle yaw sensing axis that is perpendicular to the carrousel axis of the first platform and perpendicular to the carrousel axis of the second platform.

The assembly also has a second platform that is within the first platform. The second platform carrousels around a carrousel axis that is perpendicular to the carrousel axis of the first platform. A gyro on the second platform has a vehicle pitch sensing axis that is perpendicular to the carrousel axis of the first platform and parallel to the carrousel axis of the second platform. The second gyro further has a vehicle roll sensing axis that is parallel to the carrousel axis of the first platform and perpendicular to the carrousel axis of the second platform.

By carrouseling the first platform, one can determine the drift rate of the yaw sensing axis of the gyro on the first platform. One can also determine the drift rate of the pitch Sensing axis of a gyro on the second platform by carrouseling the first platform. The first platform would be returned to its original position. The drift rate of the roll sensing axis of the rate gyro on the second platform can then be determined by carrouseling the second platform. Then the drift rate of the roll sensing axis of the rate gyro on the first platform can be determined from the known drift rate of the roll sensing axis of the rate gyro on the second platform. Thus drift in three orthogonal directions, that is along the above named yaw, pitch and roll sensing axes, could be determined by use of the above described assembly.

The gyro platform assembly of the present invention can detect a angular drift rate of a sensing axis of a rate gyro on a first platform, even though the sensing axis of the rate gyro on a first platform is parallel to a carrousel axis of the first platform. First, a sensing axis of a rate gyro on the second platform is made parallel to the sensing axis of the gyro on the first platform. Then, by carrouseling the second platform, the drift rate of the sensing axis of the rate gyro on the second platform is determined. The drift rate of the sensing axis of the rate gyro on the first platform, that is parallel to the first carrousel axis, can then be determined based on the determined drift rate of the sensing axis of the rate gyro on the second platform.

More specifically, the output of the sensing axis of the rate gyro on the first platform, that is parallel to the carrousel axis of the first platform, is measured. This output is due to the angular rotation rate of the first platform around this sensing axis. The output of the sensing axis of the rate gyro on the second platform, that is parallel to the first carrousel axis, is also measured. This output is due to the angular rotation rate of the first and second platforms around this latter sensing axis. The second platform is then carrouseled 180 degrees. The output of the sensing axis of the rate gyro on the second platform is again measured. The outputs of the parallel sensing axes of the rate gyros on the first and second platforms, plus the output of the sensing axis of the rate gyro on the second platform after the second platform has been carrouseled 180 degrees, are used in an algorithm to determine angular drift rate of the sensing axis of the rate gyro on the first platform. The calculated angular drift rate can be used in a computer to determine the true angular rotation of the assembly around the sensing axis of the rate gyro on the first platform.

SUMMARY OF THE INVENTION

A gyro platform assembly comprising first platform means for supporting a rate-gyro means, first carrousel shaft means for supporting the first platform means, rate-gyro means located on the first platform means for sensing for rotation, second platform means for supporting second rate-gyro means, second carrousel shaft means for supporting the second platform means, the second carrousel shaft means connected between the first platform means and the second platform means, the second carrousel shaft means being perpendicular to the first carrousel shaft means, a second rate-gyro means located on the second platform means for sensing for rotation.

DESCRIPTION OF THE PREFERRED EMBODIMENT

Figure 1:
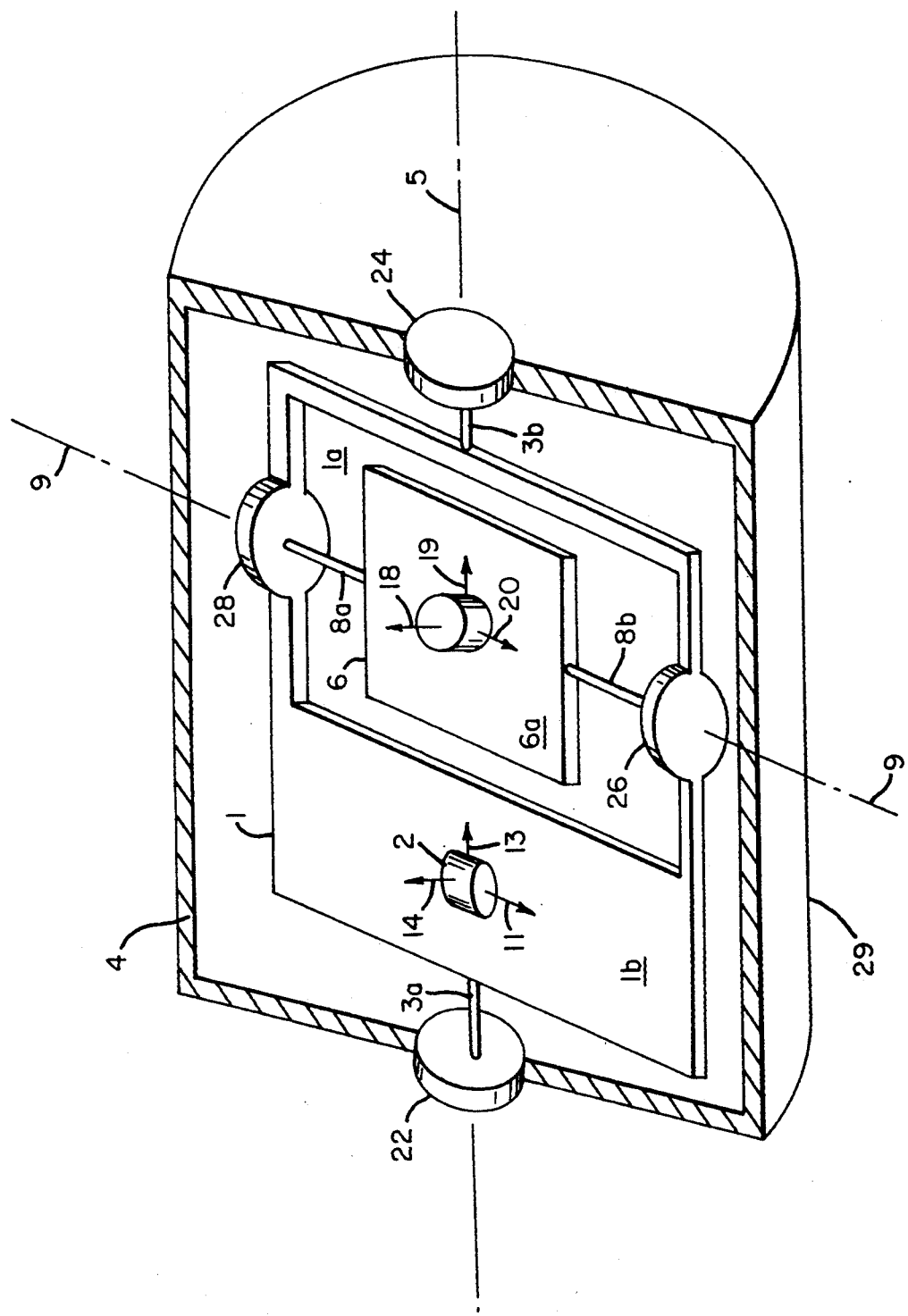
FIG. 1 is a perspective view of a gyro platform assembly.

FIG. 1 shows a first platform 1. Platform 1 has an opening 1a therein. A surface 1b of first platform 1 supports a strapped down two-degree-of-freedom rate gyro 2. The platform 1 is readily attached to carrousel shafts 3a and 3b. Carrousel shafts 3a and 3b are rotatably attached to case 4, in order to carrousel platform 1. Carrousel shafts 3a and 3b form a carrousel axis 5. Platform 1 can be carrouseled by 180 degrees around carrousel shafts 3a and 3b.

A second platform 6 is rotatably attached to platform 1. The second platform 6 is, in the preferred embodiment, within the opening 1a of the platform 1. However the platform 6 could be otherwise attached to platform 1, such as to an end of platform 1. The surface 6a of platform 6 supports a strapped down two-degree-of-freedom rate gyro 7. The second inner platform 6 is carrouselable on carrousel shafts 8a and 8b around axis 9, by 180 degrees. Carrousel shafts 8a and 8b are rotatably connected to platform 1 at inner edges of platform 1. Carrousel shafts are rigidly connected to the outer edges of platform 6. The platform 6 is carrouselable on carrousel shafts 8a and 8b around carrousel axis 9. Carrousel axis 9 is in line with carrousel shafts 8a and 8b.

The two-degree-of-freedom rate gyro 2 has a spin axis 11 and two sensing axes 13 and 14. Gyro 2 is located on platform 1 such that sensing axis 13 of gyro 2 is substantially in line with axis 5. The sensing axis 13 is substantially in the plane 1b of the platform 1. The sensing axis 14 is perpendicular to the axis 5 and substantially perpendicular to the plane 1b of platform 1. The spin axis 11 of gyro 2 is substantially perpendicular to the axis 5 and substantially in the plane 1b of the platform 1.

Sensing axes 13 and 14 sense rotation rate. The sensing axis 13 of rate gyro 2 senses the rate of angular rotation, $(dR1/dt)$, of gyro 2 around sensing axis 13. R1 is a rotation angle in a given period of time. t is a time variable. The sensing axis 14 senses for the rate of angular rotation $(dR2/dt)$ of gyro 2 around sensing axis 14. R2 is a rotation angle in a given period of time. These sensing axes 13 and 14 are also known as input axes.

Sensing axis 13 of rate gyro 2 provides an output signal S1. The output signal S1 is a function of the rate of rotation $dR1/dt$ of gyro 2 around sensing axis 13. The output signal S1 is also a function of the angular drift rate $dD1/dt$. S1 equals $K(dR1/dt+dD1/dt)$ where K is a gyro sensing constant of gyro 2.

Sensing axis 14 of rate gyro 2 provides an output signal S2. The output signal S2 is a function of the rate of rotation $dR2/dt$ of gyro 2 around sensing axis 14. The output signal S2 is also a function of the angular drift rate $dD2/dt$. S2 equals $K(dR2/dt+dD2/dt)$ where K is a gyro sensing constant of gyro 2.

The two-degree-of-freedom rate gyro 7 has a spin axis 18 and two sensing axes 19 and 20.

Gyro 7 is located on platform 6 such that sensing axis 19 of gyro 7 is substantially perpendicular to carrousel axis 9. The sensing axis 19 is substantially in the plane 6a of the platform 6. The sensing axis 20 is substantially in line with the carrousel axis 9 and substantially in the plane 6a of platform 6. The spin axis 18 of gyro 7 is substantially perpendicular to the carrousel axis 9 and substantially perpendicular to the plane 6a of the platform 6.

Sensing axis 19 of rate gyro 7 provides an output signal S3. The output signal S3 is a function of the rate of rotation $dR3/dt$ of gyro 7 around sensing axis 19. R3 is a rotation angle in a given period of time. The output signal S3 is also a function of the angular drift rate $dD3/dt$. S3 equals $K(dR3/dt+dD3/dt)$ where K is a gyro sensing constant of gyro 7.

Sensing axis 20 of rate gyro 7 provides an output signal S4. The output signal S4 is a function of the rate of rotation $dR4/dt$ of gyro 7 around sensing axis 20. R4 is a rotation angle in a given period of time. The output signal S4 is also a function of the angular drift rate $dD4/dt$. S4 equals $K(dR4/dt+dD4/dt)$ where K is a gyro sensing constant of gyro 7.

Figure 3:
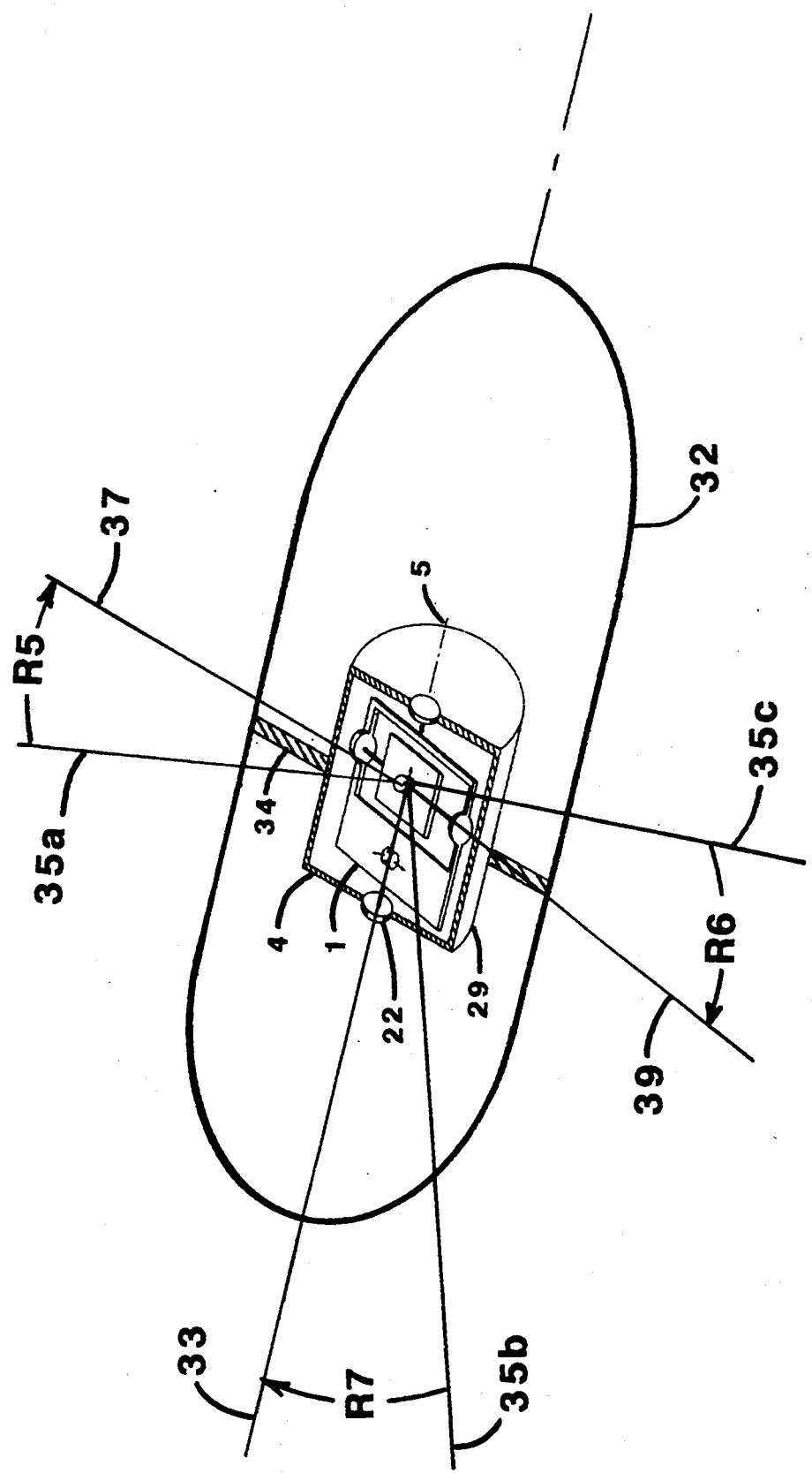
FIG. 3 is a perspective view of an inertial platform assembly mounted in a vehicle.

As shown in FIG. 3, the roll angle of vehicle 32 with respect to axis 35a of frame of reference 35a, 35b and 35c is R5. The rate of roll is $dR5/dt$. The yaw angle of vehicle 32 with respect to axis 35c of frame of reference 35a, 35b and 35c is R6. The rate of yaw of vehicle 32 is $dR6/dt$. The pitch angle of vehicle 32 with respect to axis 35b of frame of reference 35a, 35b and 35c is R7. The rate of pitch is $dR7/dt$.

In FIG. 3, $dR1/dt$ equals minus $dR5/dt$ since sensing axis 13, shown in FIG. 1, is aligned along but opposite roll axis 33 of vehicle 32. Further, $DR3/dt$ equals minus $dR5/dt$ since sensing axis 19 is aligned along but opposite roll axis 33. In FIG. 3, $dR2/dt$ equals $dR6/dt$ since sensing axis 14, shown in FIG. 1, is aligned with yaw axis 37 of vehicle 32. Still further, $dR4/dt$ equals $dR7/dt$ since sensing axis 20, shown in FIG. 1, is aligned with pitch axis 39 of vehicle 32.

Thus in the arrangement of FIG. 3, $S1=K(-dR5/dt+dD1/dt)$. $S2=K(dR6/dt+dD2/dt)$. $S3=K(-dR5/dt+dD3/dt)$. $S4=K(dR7/dt+dD4/dt)$.

Figure 2:
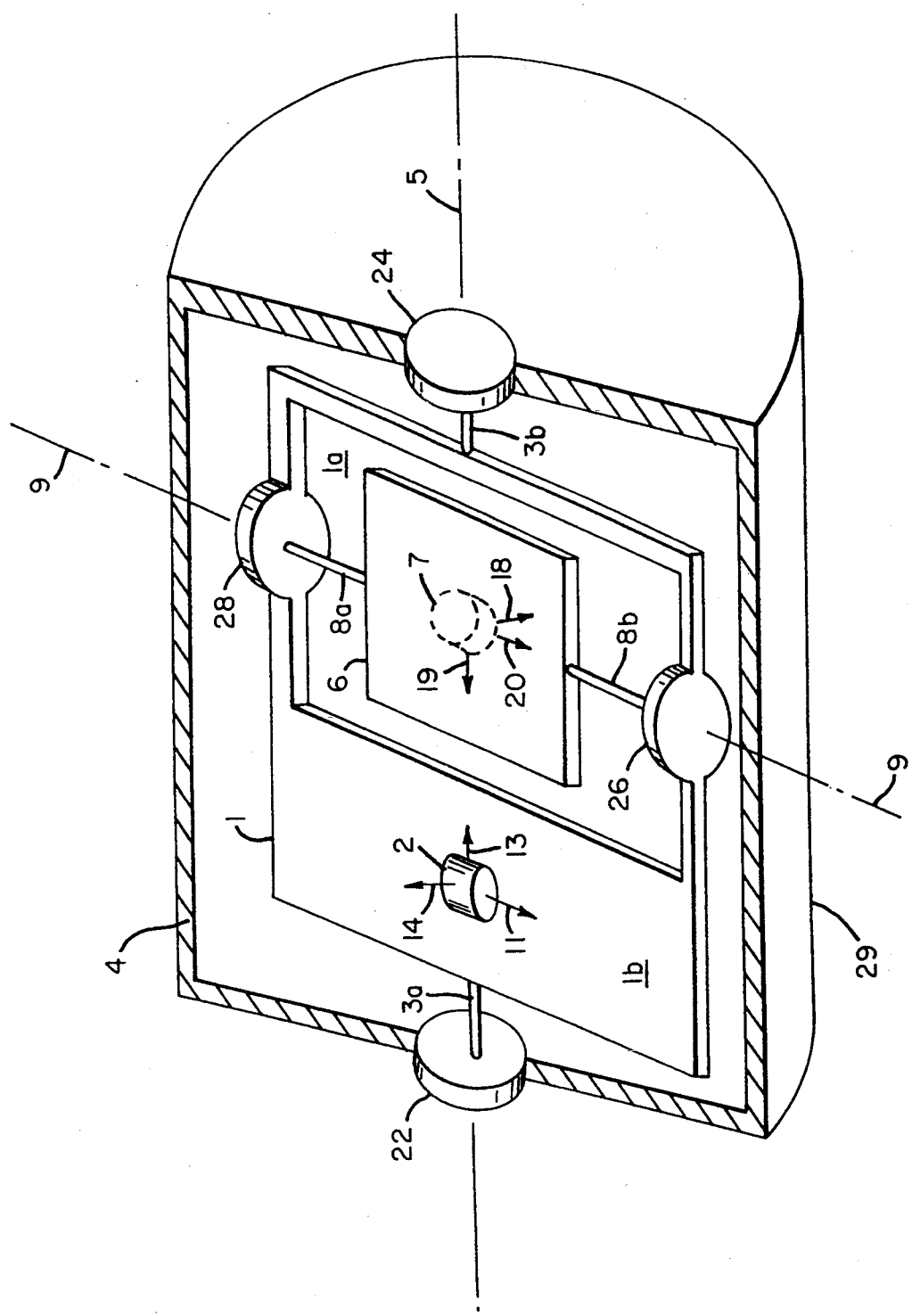
FIG. 2 is a perspective view of a gyro platform assembly wherein the second platform has been carrouseled.

As shown in FIG. 2, platform 6 has been carrouseled by 180 degrees. Sensing axis 19 now provides an output signal $S3'=K(dR5/dt+d\ D3/dt)$ due to rate of roll rotation $dR5/dt$ of vehicle 32, and due to drift rate $d\ D3/dt$. R5 is a roll rotation angle in a given period of time. S3' equals $K(dR5/dt+d\ D3/dt)$ where K is a gyro sensing constant of gyro 7. Gyros 2 and 7 are designed to have the same value of gyro sensing constant K.

Platform 1 is carrouselable by torquer 22 in combination with resolver 24. Platform 6 is carrouselable by torquer 26 in combination with resolver 28. FIGS. 1 and 2 show a gyro platform assembly 29.

It is again noted that a two-degree-of-freedom rate gyro senses for a rate of angular rotation around each of its two mutually orthogonal sensing axes. These sensing axes are also known as input axes. The two sensing axes are orthogonal to a rotor spin axis of the two-degree-of-freedom rate gyro.

In the present invention, two single-degree-of-freedom rate gyros could replace the above mentioned two-degree-of-freedom rate gyro 2 on platform 1. Further, two single-degree- of -freedom rate gyros could replace the above mentioned two-degree-of-freedom rate gyros 7 on platform 6.

As shown in FIG. 3, case 4 of assembly 29 of FIG. 1 is rigidly connected to a vehicle 32 by braces 34 and 36. In this application, case 4 is used as an inertial platform case unit. Carrousel axis 5 of assembly 9 is placed in line with the main or roll axis 33 of vehicle 32.

Of course, carrousel axis 5 could alternately be placed along the yaw axis 37 of the vehicle. Still further, carrousel axis 5 could be placed along pitch axis 39 of vehicle 32.

Platform 1 is normally fixed with respect to vehicle 32. Platform 1 is not normally rotated by torquer 22. Thus platform 1 rolls around axis 33 as vehicle 32 rolls around roll axis 33, in the configuration shown in FIG. 3. Roll axis 33 is in line with sensing axis 13 of FIG. 1. Yaw axis 37 of vehicle 32 is in line with sensing axis 14 of FIG. 1. Pitch axis 39 of vehicle 32 is in line with sensing axis 20 of FIG. 1.

Sensing axis 13 of rate gyro 2 is used to measure the rate of change of roll angle $dR5/dt$ of vehicle 32 with time. Sensing axis 19 of rate gyro 7 is used to measure the rate of change of roll angle $dR5/dt$ of vehicle 32 with time. Sensing axis 14 of rate gyro 2 is used to measure the rate of change of yaw angle $dR6/dt$ of vehicle 32 with time. Sensing axis 20 of rate gyro 7 is used to measure the rate of change of pitch angle $dR7/dt$ of vehicle 32 with time.

The assembly 29 is used to detect a change in attitude of vehicle with respect to the vehicle's initial attitude as denoted by axes 35a, 35b and 35c. That is, the roll angle R5, yaw angle R6 and pitch angle R7 of vehicle 32 are determined by measuring the rate of change of roll, dR5/dt, of vehicle 32 around roll axis 33, by measuring the rate of change of pitch, dR7/dt, of vehicle 32 around pitch axis 39, and by measuring the rate of change of yaw dR6/dt, of vehicle 32 around yaw axis 37.

An integration of the output S1 of sensing axis 13 over a period of time provides an errored magnitude of a roll angle R5 of vehicle 32 over that period of time. This errored magnitude is due to drift angle D1.

An integration of the output S2 of sensing axis 14 over a period of time provides an errored magnitude of a yaw angle R6 of vehicle 32 over that period of time. This errored magnitude is due to drift angle D2.

An integration of the output S3 of sensing axis 19 over a period of time provides an errored magnitude of a roll angle R5 of vehicle 32 over that period of time. This errored magnitude is due to drift angle D3.

An integration of the output S4 of sensing axis 20 over a period of time provides an errored magnitude of a pitch angle R7 of vehicle 32 over that period of time. This errored magnitude is due to drift angle D4.

While vehicle 32 is not yawing around axis 37 and not pitching around axis 39, drift rates dD2/dt and dD4/dt are determined by carrouseling platform 1 by 180 degrees. Platform 1 is returned to its initial position. While vehicle 32 is not rolling around axis 33, drift rate dD3/dt is determined by carrouseling platform 6 by 180 degrees.

The drift rates dD2/dt and dD4/dt of sensing axes 14 and 20 can be determined by carrouseling platform 1 by 180 degrees. The drift rate dD3/dt of sensing axis 19 can be determined by carrouseling platform 6 by 180 degrees. However it is more difficult to determine the drift rate dD1/dt of sensing axis 13, since sensing axis 13 cannot be carrouseled 180 degrees with respect to itself.

Sensing axis 13 could experience angular drift rate dD1/dt. This angular drift rate dD1/dt is detectable in assembly 29, even though carrousel axis 5 is basically in line with the sensing axis 13.

To determine gyro drift in sensing axis 13, means and method are used. It is assumed that vehicle 32 is rolling at roll rate dR5/dt. The inner platform 6 is adjusted to accurately align the sensing axis 19 with the sensing axis 13. S1 and S3 are determined. Sensing axis 19 is then aligned in the opposite direction by carrouseling platform 6. Platform 6 is carrouseled 180 degrees within case 4 by torquer 26 and resolver 28, as shown in FIG. 2 S3, called S3' is then determined.

The process permits calculation of gyro drift rate dD1/dt, so that gyro drift rate dD1/dt can be eliminated from S1. Elimination of the drift rate allows for a calculation of rate of rotation, dR1/dt, of gyro 2 around sensing axis 13.

The following terms are defined for use in the equations below:

(a) S1 is the signal from sensing axis 13 at time t2;

(b) (dR5/dt) is the rotation rate of gyro 2 around sensing axis 13 at time t2;

(c) dD1/dt is the drift rate of sensing axis 13 at t2;

(d) S3 is the signal from sensing axis 19 at time t2 that is just prior to the time of carrouseling platform 6;

(e) (−dR5/dt) is the rotation rate of gyro 7 around sensing axis 19 at time t2 that is just prior to the time of carrouseling platform 6;

(f) d D3/dt is the drift rate of sensing axis 19 at time t2;

(g) S3' is the signal from sensing axis 19 at time t3 that is just after the time of carrouseling platform 6;

(h) (dR5/dt) is the rotation rate of gyro 7 around sensing axis 19 at time t3 that is just after the time of carrouseling platform 6;

(i) d D3'/dt is the drift rate of sensing axis 19 at time t3;

(j) time t2 is a time just prior to a carrouseling step on platform 6;

(k) time t3 is a time just after a carrouseling step on platform 6. It is assumed that the drift rate of sensing axis 19 does not change appreciably from time t2 to time t3, and thus d D3'/dt equals d D3/dt.

For a mathematical explanation, of the error elimination process, see equations 1–10 below.

(1) $S1 = K((-dR5/dt) + dD1/dt)$
(2) $S3 = K((-dR5/dt) + dD3/dt)$
(3) $S3' = K((dR5/dt) + dD3'/dt)$
(4) $S3 + S3' = K(dD3/dt + dD3'/dt)$
(5) $dD3/dt = (S3 + S3')/2K$ since $dD3'/dt = dD3/dt$
(6) $(-dR5/dt) = (S3 - S3')/2K$
(7) $dD1/dt = (S7/K)) - (S3 - S3')/2K$
(8) $S'1 = S1 - K(dD1/dt)$
(9) $S'1 = (S3 - S3')/2$ Consider that the two gyro sensing axes 13 and 19 are aligned in the same direction, as shown in FIG. 1. Equation 1 shows that the measured signal from sensing axis 13 is equal to a proportionality constant K times the negative of the roll rotation rate dR5/dt of vehicle 32 plus drift rate dD1/dt of gyro 2.

Equation 2 shows that the sensed rotation rate S3 of gyro 7 around sensing axis 19 is equal to K times the negative of the roll rotation rate, dR5/dt, of vehicle 32 plus drift rate dD3/dt of gyro 7.

After platform 6 is carrouseled, equation 3 shows that the sensed rotation rate S3' of gyro 7 around sensing axis 19 is equal to K times the roll rotation rate, dR5/dt, of vehicle 32 plus drift rate dD3'/dt of gyro 7. S3 and S3' will not have the same absolute value if sensing axis 19 has a drift rate at time Adding equations 2 and 3 results in equation 4, where platform motion cancels and what is left is K times the sum of the gyro drift rates for sensing axis 19 before and after carrouseling platform 6.

Equation 5 is obtained from equation 4 after substituting dD3/dt for dD3'/dt in equation 4. Equation 6 is obtained by substituting the value for dD3/dt of equation 5 into equation 2. Equation 7 is obtained by substituting the value of −dR5/dt from equation 6 into equation 1. Equation 8 is a statement that the signal S1 from sensing axis 13 can be corrected to produce a corrected signal S'1, by subtracting the value of K(dD1/dt) from S1. Equation 9 is obtained by substituting the value of dD1/dt from equation 7 into equation 8.

In the assembly 29, as used, drift error about each of the two sensing axes 14 and 20 is averaged to zero and drift error about the sensing axis 13 is eliminated, thereby providing an inertial platform assembly 29 with reduced gyro drift about three orthogonal axes. Further axis 19 can be used as an additional roll sensing axis in the arrangement of FIG. 1.

Figure 4:
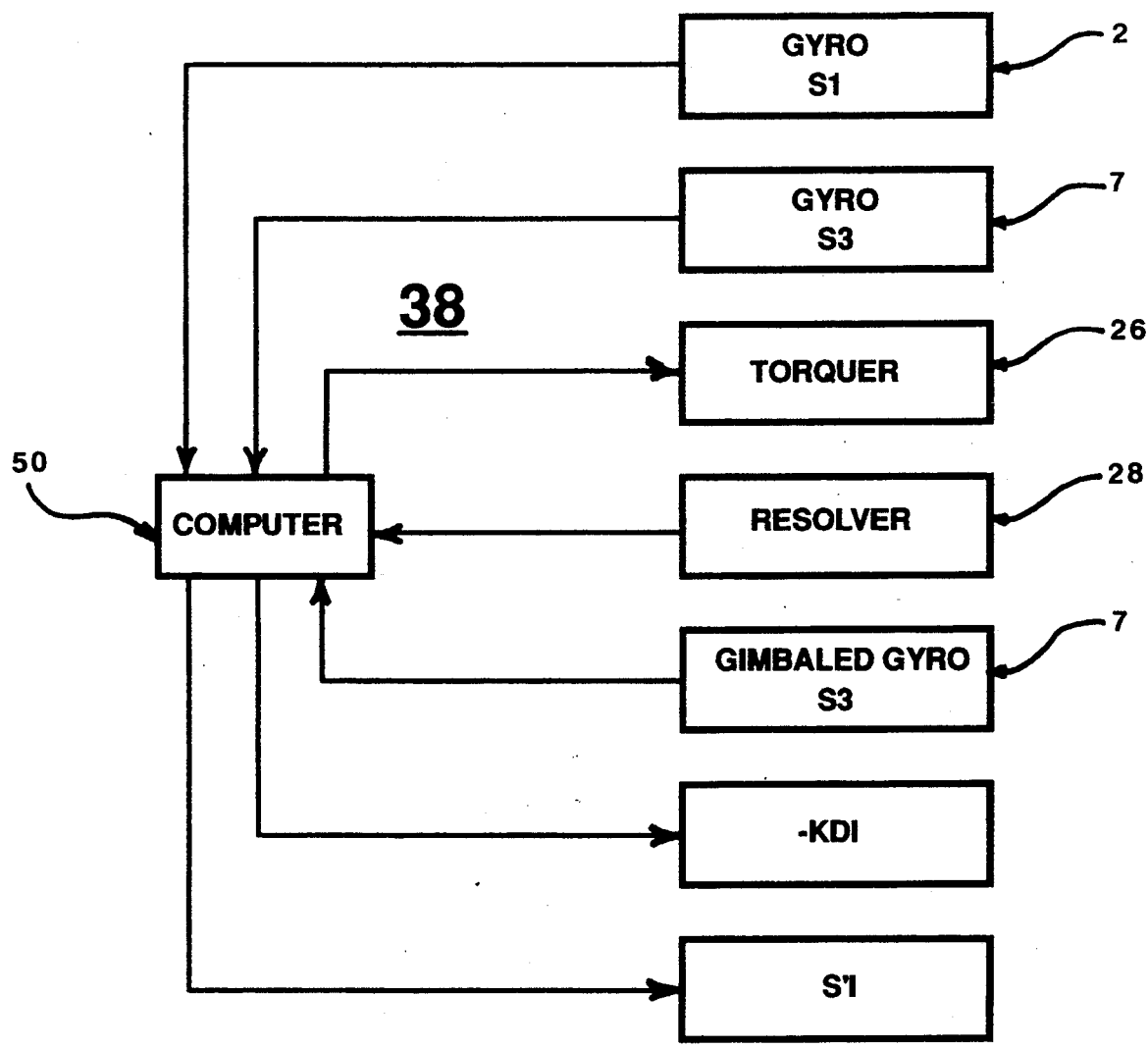
FIG. 4 is a block diagram of a computerized system used to determining and compensating for a drift rate of a rate gyro on the first platform of the gyro platform assembly.

FIG. 4 shows a computerized system 38 to eliminate drift error about axis 13 and to use the resultant error free signal S'1 from axis 13. Computer 50 receives and operates on signals S1, S3 and S3' to determine dD1/dt. Computer 50 has a program therein that includes the set of nine equations given above. Computer 50 receives signal S1 from gyro 2. Computer 50 receives signal S3 from gyro 7. Gyro 7 is gimbaled 180 degrees by means of torquer 27 and resolver 28. Computer 50 then receives signal S3' from gyro 7. Computer 50 then calculates the drift rate dD1/dt of gyro 2 from the first seven equations given above.

The calculated value of dD1/dt is used in computer 50 to modify signal S1. K(dD1/dt) is subtracted from S1 to form S'1. S'1 is integrated over a period of time to find the true roll angle R5 of vehicle 32.

Again, gyro 2 has a sensing axis 13. Sensing axis 13 is used as a roll output axis of assembly 29. Sensing axis 13 is aligned along roll axis 33 of vehicle 32 of FIG. 3, by attaching assembly 29 to vehicle 32. Sensing axis 13 senses the negative rate of change of roll angle R5 of vehicle 32 around the roll axis 33 of vehicle 32. The roll plane of vehicle 32 is also shown in FIG. 3. The roll plane is perpendicular to the roll axis 33 of vehicle 32.

Assembly 29 can detect drift rate in a sensing axis 13 of gyro 2, that is along carrousel axis 5 of assembly 29.

Again, sensing axis 13 of gyro 2 may have a drift rate dD1/dt. The gyro platform assembly 29 will allow one to find this drift rate dD1/dt. The negative amount of roll R5 of vehicle 32 is thereby better determined by means of assembly 29.

Sensing axis 13 of gyro 2 provides output signal S1. The output signal S1 is proportional to the sum of the negative roll rotation rate dR5/dt of vehicle 32, plus the drift rate dD1/dt.

Sensing axis 14 of gyro 2 can be used to sense the amount of yaw of vehicle 32 over a period of time. Sensing axis 14 is perpendicular to sensing axis 13 and to spin axis 11 of gyro 2.

Sensing axis 14 of gyro 2 also provides an output signal that is proportional to the yaw rotation rate dR6/dt of vehicle 32, plus any drift rate in sensing axis 14. Sensing axis 14 can be used as a yaw sensing axis for vehicle 32.

Sensing axis 20 of gyro 7 can be used to sense the amount of pitch of vehicle 32 over a period of time.

Sensing axis 20 provides an output signal that is proportional to the pitch rotation rate of vehicle 32, plus any drift rate in sensing axis 20.

Sensing axis 19 can also be used to sense the negative roll rate of vehicle 32.

Sensing axis 19 may have a drift rate dD3/dt. The inertial platform assembly 29 will allow one to find this drift rate dD3/dt.

Gyro 7 provides an output signal S3 that is proportional to the sum of the negative amount of roll rotation rate dR3/dt of vehicle 32, plus the amount of drift rate dD3/dt, when platform 6 is in the configuration shown in FIG. 1.

Gyro 7 provides an output signal S3' that is proportional to the sum of the amount of roll rotation rate dR5/dt of vehicle 32, plus the drift rate dD3'/dt, when platform 6 is in the configuration shown in FIG. 2.

The platform 1 rotates around roll axis 33 as the vehicle 32 rolls. The platform 1 is a roll-yaw platform.

The platform 6 rotates around pitch axis 39 as the vehicle 32 pitches. The platform 6 is a roll-pitch platform.

The gyro 2 is used as a roll-yaw gyro. Gyro 2 will itself allow for detection of roll of the vehicle 32, in the arrangement shown in FIG. 1. Gyro 2 will itself allow for detection of yaw of the vehicle 32, in the arrangement shown in FIG. 1.

The gyro 7 is used as a roll-pitch gyro. Gyro 7 will itself allow for detection of roll of the vehicle 32, in the arrangement in FIG. 1. Gyro 7 will itself allow for detection of pitch of the vehicle 32 in the arrangement shown in FIG. 1.

Three accelerometers (not shown) may also be mounted on platform 1.

While the present invention has been disclosed in connection with the preferred embodiment thereof, it should be understood that there may be other embodiments which fall within the spirit and scope of the invention as defined by the following claims.

What is claimed is:

1. A gyro platform assembly, comprising:
   (a) first platform means having a plane and an opening, for supporting a gyro means, the first platform means being supported along a carrousel axis;
   (b) first gyro means located on the plane of the first platform means for sensing for rotation, the first gyro means having two mutually orthogonal sensing axes, a first sensing axis being orthogonal to the carrousel axis of the first platform means and a second sensing axis being in line with the carrousel axis of the first platform means;
   (c) means for rotating the first platform means around its carrousel axis;
   (d) second platform means having a surface and connected to the first platform means within the opening of the first inertial platform means, for supporting a second gyro means, the second platform means being supported along a carrousel axis, the carrousel axis of the second platform means being orthogonal to the carrousel axis of the first platform means;
   (e) second gyro means located on the surface of the second platform means for sensing for rotation, the second gyro means having two mutually orthogonal sensing axes, a first sensing axis of the second gyro means being orthogonal to the carrousel axis of the first platform means and a second sensing axis of the second gyro means being alignable with the carrousel axis of the first platform means; and
   (f) carrousel means for carrouseling the second platform means around its carrousel axis.

2. A gyro platform assembly, comprising:
   (a) first platform means having a plane and an opening, for providing support, the first platform means having a carrousel axis;
   (b) first rate-gyro means located on the plane of the first platform means, the first rate-gyro means having a sensing axis substantially in line with the carrousel axis of the first platform means, for sensing for rotation;
   (c) means for rotating the first platform means around its carrousel axis;
   (d) second platform means having a surface and being connected to the first platform means within the opening, for providing support, the second platform means having a carrousel axis that is substantially perpendicular to the sensing axis of the first rate-gyro means;
   (e) second rate-gyro means located on the surface of the second platform means, the second rate-gyro means having a sensing axis that is substantially alignable with the sensing axis of the first rate-gyro means, for sensing for rotation;
   (f) means for carrouseling the second platform means around its carrousel axis; and
   (g) computer means for calculating a drift rate of the sensing axis of the first rate-gyro means from a signal from the sensing axis of the first rate-gyro means, a signal from the sensing axis of the second rate-gyro means, and a signal from the sensing axis of the second rate-gyro means after the second platform means is carrouseled 180 degrees.

3. A gyro platform assembly, comprising:
(a) first platform means having a plane and an opening, for providing support, the first platform means having a carrousel axis;
(b) first two-degree-of-freedom rate-gyro means located on the plane of the first platform means for sensing for rotation, a first sensing axis of its two orthogonal sensing axes being in line with the carrousel axis of the first platform means;
(c) means for rotating the first platform means around its carrousel axis;
(d) second platform means having a surface, for providing support, the second platform means being connected to the first platform means within the opening, the second platform means having a carrousel axis that is substantially perpendicular to the first sensing axis of the first rate-gyro means;
(e) second two-degree-of-freedom rate-gyro means located on the surface of the second platform, for sensing for rotation, a first orthogonal sensing axis being substantially alignable with said first sensing axis of the first rate-gyro means at which time the other of its sensing axes is orthogonal to the two sensing axes of the first rate-gyro means;
(f) means for carrouseling the second platform means around its carrousel axis; and
(g) computer means for calculating a drift rate of the first sensing axis of the first rate-gyro means from a signal from the sensing axis of the first rate-gyro means, a signal from the first sensing axis of the second rate-gyro means, and a signal from the first sensing axis of the second rate-gyro means after the second platform means is carrouseled 180 degrees.

4. A gyro platform assembly, comprising:
(a) first platform means having a plane and an opening, for providing support, the first platform means having a carrousel axis;
(b) first two-degree-of-freedom rate-gyro means located on the plane of the first platform means, the first rate-gyro means having a first sensing axis of its two sensing axes in line with the carrousel axis of the first platform means, for sensing for rotation;
(c) means for rotating the first platform means around its carrousel axis;
(d) second platform means having a surface, for providing support, the second platform means having a carrousel axis, the second platform means being connected to the first platform means within the opening, the carrousel axis being substantially perpendicular to the first sensing axis of the first rate-gyro means;
(e) second two-degree-of-freedom rate-gyro means located on the surface of the second platform, the second rate-gyro means having a first sensing axis that is substantially alignable with said first sensing axis of the first rate-gyro means and having a second sensing axis orthogonal to the two sensing axes of the first rate-gyro means, for sensing for rotation; and
(f) means for carrouseling the second platform means around its carrousel axis; and
(g) computer means for calculating a drift rate of the first sensing axis of the first rate-gyro means from a signal from the first sensing axis of the first rate-gyro means, a signal from the first sensing axis of the second rate-gyro means, and a signal from the first sensing axis of the second rate-gyro means after the second platform means is carrouseled 180

5. An inertial platform case unit for a vehicle, the vehicle having a vehicle rotation axis, the inertial platform case unit comprising:
(a) case means mountable to the vehicle;
(b) a first platform within the case means, the first platform having a plane and an opening, and being carrouselable around a first carrousel axis, the first carrousel axis located along the vehicle rotation axis;
(c) first gyro means located on the plane of the first platform and having a sensing axis parallel to the first carrousel axis, for sensing for rotation of the vehicle around the vehicle rotation axis;
(d) a second platform having a surface, the second platform being connected to the first platform within the opening of the first platform, the second platform being carrouselable around a second carrousel axis, the second carrousel axis being in the plane of the first platform and perpendicular to the first carrousel axis;
(e) second gyro means located on the surface of the second platform and having a sensing axis parallel to the carrousel axis of the first platform, for sensing for rotation of the vehicle around the vehicle rotation axis;
(f) carrousel means for carrouseling the second platform means around its carrousel axis; and
(g) computer means for calculating a drift rate of the sensing axis of the first gyro means from a signal from the sensing axis of the first gyro means, a signal from the sensing axis of the second gyro means, and a signal from the sensing axis of the second gyro means after the second platform is carrouseled 180 degrees.

6. The inertial platform case unit of claim 5 wherein the first gyro means has a spin axis, the spin axis of the first gyro means being perpendicular to the first carrousel axis, the spin axis of the first gyro means also being parallel to the plane of the first platform, the first gyro having first drift characteristics, and wherein the second gyro means has a spin axis, the spin axis of the second gyro means being perpendicular to the plane of the second platform, the second gyro means having second drift characteristics.

7. The inertial platform case unit of claim 6 wherein the first gyro means is a two-degree-of-freedom gyro and wherein the second gyro means is a two-degree-of-freedom gyro.

8. The inertial platform case unit of claim 6 and further comprising a vehicle having said vehicle rotation axis.

9. The inertial platform case unit of claim 7 and further comprising a vehicle having said vehicle rotation axis.

10. The inertial platform case unit of claim 5 and further comprising a vehicle having said vehicle rotation axis.

* * * * *